US010210096B2

(12) United States Patent
Ben-Meir

(10) Patent No.: US 10,210,096 B2
(45) Date of Patent: Feb. 19, 2019

(54) MULTI-STAGE ADDRESS TRANSLATION FOR A COMPUTING DEVICE

(71) Applicant: Ampere Computing LLC, Santa Clara, CA (US)

(72) Inventor: Amos Ben-Meir, San Jose, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 420 days.

(21) Appl. No.: 14/101,948

(22) Filed: Dec. 10, 2013

(65) Prior Publication Data

US 2015/0095610 A1 Apr. 2, 2015

Related U.S. Application Data

(63) Continuation-in-part of application No. 14/042,957, filed on Oct. 1, 2013.

(51) Int. Cl.
*G06F 12/1027* (2016.01)
*G06F 12/1036* (2016.01)
*G06F 12/109* (2016.01)
*G06F 12/00* (2006.01)

(52) U.S. Cl.
CPC ........ *G06F 12/1027* (2013.01); *G06F 12/109* (2013.01); *G06F 12/1036* (2013.01)

(58) Field of Classification Search
CPC .................................................. G06F 12/1027
USPC ....................................................... 711/207
See application file for complete search history.

(56) References Cited

U.S. PATENT DOCUMENTS

| 6,715,057 | B1* | 3/2004 | Kessler | G06F 12/1009 |
| | | | | 711/207 |
| 7,325,102 | B1 | 1/2008 | Cypher | |
| 7,979,671 | B2 | 7/2011 | Aviles | |
| 2002/0144081 | A1* | 10/2002 | Willis | G06F 12/1027 |
| | | | | 711/206 |
| 2006/0206687 | A1* | 9/2006 | Vega | G06F 12/10 |
| | | | | 711/206 |
| 2006/0271760 | A1* | 11/2006 | Nicolai | G06F 12/1036 |
| | | | | 711/207 |
| 2009/0292899 | A1* | 11/2009 | Mansell | G06F 12/1009 |
| | | | | 711/207 |
| 2010/0058026 | A1* | 3/2010 | Heil | G06F 12/1027 |
| | | | | 711/207 |

(Continued)

*Primary Examiner* — Gautam Sain
(74) *Attorney, Agent, or Firm* — Alston & Bird LLP

(57) ABSTRACT

Providing for address translation in a virtualized system environment is disclosed herein. By way of example, a memory management apparatus is provided that comprises a shared translation look-aside buffer (TLB) that includes a plurality of translation types, each supporting a plurality of page sizes, one or more processors, and a memory management controller configured to work with the one or more processors. The memory management controller includes logic configured for caching virtual address to physical address translations and intermediate physical address to physical address translations in the shared TLB, logic configured to receive a virtual address for translation from a requester, logic configured to conduct a table walk of a translation table in the shared TLB to determine a translated physical address in accordance with the virtual address, and logic configured to transmit the translated physical address to the requester.

23 Claims, 9 Drawing Sheets

(56) References Cited

U.S. PATENT DOCUMENTS

| | | | |
|---|---|---|---|
| 2011/0087858 A1* | 4/2011 | Persson | G06F 12/1027 |
| | | | 711/206 |
| 2012/0117301 A1* | 5/2012 | Wingard | G06F 12/1027 |
| | | | 711/6 |
| 2012/0331265 A1* | 12/2012 | Rozario | G06F 12/1027 |
| | | | 711/207 |
| 2014/0047251 A1* | 2/2014 | Kottilingal | G06F 1/3296 |
| | | | 713/320 |
| 2015/0089150 A1* | 3/2015 | Kessler | G06F 12/1045 |
| | | | 711/139 |

* cited by examiner

MULTI-STAGE ADDRESS TRANSLATION FOR A COMPUTING DEVICE

REFERENCE TO RELATED APPLICATIONS

This application is a Continuation-In-Part of U.S. patent application Ser. No. 14/042,957, which was filed on Oct. 1, 2013, the entirety of which is hereby incorporated by reference.

TECHNICAL FIELD

The present disclosure relates to the field of computing; e.g., aspects of the present disclosure relate to a translation look-aside buffer that facilitates multi-stage address translation in a common cache.

BACKGROUND

In the field of computing, general purpose central processing devices often utilize some form of virtual memory. In this context, virtual memory can facilitate efficient operation of higher-order computer processes, such as application-level processes. This can be accomplished by providing one or more virtual address spaces for different processes executing on a computer. A virtual address space can facilitate interaction with device memory by way of a simplified address space, which contains code and data pertinent to one process, but that might be unrecognized or inapplicable to another process. Furthermore, the application-level process can utilize and reference the simplified address space (e.g., virtual memory) independent of where data or code is physically located on physical memory.

To operate an environment with virtual memory, components of a central processing device translate virtual addresses generated by a higher-order computer process into physical addresses that reference actual locations on a physical memory. The component of the central processing device that typically performs the address translation is referred to as a memory management component, or memory management unit. A particular virtual to physical translation can be stored in a lookup table for later reference by the memory management unit, to reduce overhead involved in repeating the particular virtual to physical translation.

Several physical characteristics are relevant to the efficiency or effectiveness of address translation. Latency, for instance, is a metric indicating an amount of time for a memory management unit to retrieve a physical address in response to receiving a virtual address. Aliasing refers to multiple virtual addresses being mapped to a single physical address. Aliasing can lead to problems in memory retrieval if an accurate association between virtual address and physical address is not maintained. Additionally, memory granularity refers to an amount of memory (e.g., kilobytes, megabytes, etc.) that can be independently mapped by the memory management unit. In some cases, multiple memory granularities can be supported by a central processing unit.

The introduction of cache memory over the past couple decades for computing devices has provided significant reduction in memory latency. Cache memory is much more quickly accessed by a central processor than system main memory. Accordingly, the more frequently the central processor can rely on cache memory for performing various memory operations, the better the performance in terms of latency and similar metrics. Likewise, for virtual environments, the reduced complexity of virtual address space can provide greater efficiency for higher-level processes, particularly when coupled with the reduced memory latency of cache memory. Ongoing development in cache systems are targeted toward further improvements for computing performance.

SUMMARY

The following presents a simplified summary in order to provide a basic understanding of some aspects described herein. This summary is not an extensive overview of the disclosed subject matter. It is intended to neither identify key elements of the disclosure nor delineate the scope thereof. Its sole purpose is to present some concepts in a simplified form as a prelude to the more detailed description that is presented later.

The present disclosure relates to a shared translation look-aside buffer (TLB) configured to support multi-stage address translation. In various embodiments, the TLB can be configured to store address translations for a plurality of address translation types (also referred to herein as virtualization types), such as a stage-1 translation type(s), a stage-2 translation type(s), or a combination of a stage-1 translation type and a stage-2 translation type. A memory management controller configured to operate with a TLB according to one or more disclosed embodiments, can achieve improved efficiency in address translation for a virtualized system, by accessing a common physical cache structure for multiple address translation types.

Virtualization environments supported by a TLB according to various disclosed embodiments can include storage and management of address translations for a guest system privilege level and a hypervisor privilege level. The guest system privilege level can facilitate management (e.g., storage, retrieval, replacement, etc.) of virtual address translations at the TLB for processes utilizing a virtual address space. The hypervisor privilege level facilitates management of direct virtual address to physical address translations for a central processing device that operates at a higher level of privilege relative to the guest privilege level. In some embodiments, the hypervisor privilege level can control availability of system resources for a process operating under the guest privilege level.

In one or more aspects of the subject disclosure, a TLB can be configured to cache (e.g., store) a plurality of address translation types in a single physical cache structure. The plurality of address translation types can be selected among a set of address translations types described herein. Examples include a virtual address to physical address translation type in a non-virtualized address space (e.g., an address translation having only one address translation operation, also referred to as a stage-1 translation), a virtual address to physical address hypervisor privilege level (e.g., a stage-1 translation), a virtual address to physical address guest privilege level translation (e.g., a combined stage-1 and stage-2 translation having a first address translation operation and a second address translation operation), a virtual address to intermediate physical address guest privilege level translation (e.g., a stage-1 translation), or an intermediate physical address to physical address guest privilege level translation (e.g., a stage-2 translation), or the like. The TLB can be configured to cache at least two of these types of address translations.

In at least one embodiment, a TLB according to the present disclosure can support selective disablement and enablement of virtualization. When virtualization is disabled, the TLB can be configured to store only stage-1 virtual address to physical address translations. When virtualization is enabled, the TLB can be configured to then store stage-1 translations, stage-2 translations or combined stage-1 and stage-2 translations.

In additional embodiments, the subject disclosure provides a TLB configured to support multiple address translation types, and multiple page sizes. In some embodiments, one or more of the multiple address translation types can support a different set of page sizes. In at least one embodiment, each of the multiple address translation types can support a different set of page sizes, or a different subset of a common set of page sizes utilized by the TLB.

In one or more embodiments, a TLB according to the subject disclosure can employ a set-associative or a fully associative management policy. For the set-associative management policy, one or more base hashing functions can be employed for address translations. In some aspects of the subject disclosure, a base hashing function can be selected from the set based on an address translation type, or page size associated with the address translation. For instance, a base hashing function of the set can be employed for an address translation, based at least in part on a translation type associated with the address translation, or a page size associated with the address translation, or a suitable combination thereof. In at least one embodiment, an additional hashing function (e.g., a secondary hashing function) can be applied to an address translation. The additional hashing function can be selected, for instance, to distribute physical location of respective stored address translations within the TLB according to one or more functions. As one example the additional hashing function can be selected to distribute physical location of respective stored address translations randomly or pseudo-randomly throughout the TLB.

In another embodiment, the subject disclosure provides a shared TLB. The shared TLB can comprise a memory cache. Furthermore, the shared TLB can comprise a memory cache controller configured to store multiple distinct types of memory address translation entries within the memory cache, the multiple distinct types comprising multiple stage-1 translation entries, multiple stage-2 translation entries, or a combination of a stage-1 and a stage-2 translation entry. In one or more embodiments, the shared TLB can comprise an interface configured to receive a first memory address and respond with a second memory address stored in the memory cache.

In further embodiments, the subject disclosure provides a method of operating a TLB. The method can comprise receiving a translation request comprising a memory address. Further, the method can comprise accessing a memory cache and identifying whether a memory address translation entry of a first virtualization type exists for the memory address within the memory cache, and providing the memory address translation entry of the first virtualization type to satisfy the translation request in response to identifying existence of the memory address translation entry of the first virtualization type within the memory cache. Additionally, the method can comprise receiving a second memory address for a second translation request. In one or more additional embodiments, the method can comprise accessing the memory cache and identifying whether a second memory address translation entry of a second virtualization type exists for the second memory address within the memory cache, and providing the second memory address translation entry of the second virtualization type to satisfy the second translation request in response to identifying existence of the second memory address translation entry of the second virtualization type within the memory cache.

In other embodiments, the present disclosure provides a TLB. The TLB can comprise a memory cache. Moreover, the TLB can comprise a first interface configured to facilitate communication between the memory cache and a memory cache controller, the memory cache controller configured to store multiple distinct types of memory address translation entries within the memory cache, the multiple distinct types comprising multiple stage-1 translation entries, multiple stage-2 translation entries, or a combination of a stage-1 and a stage-2 translation entry. In addition to the foregoing, the TLB can comprise a second interface configured to facilitate communication between the memory cache controller and a system application functioning as a guest operating system with respect to the memory cache controller.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

DETAILED DESCRIPTION

Figure 1:
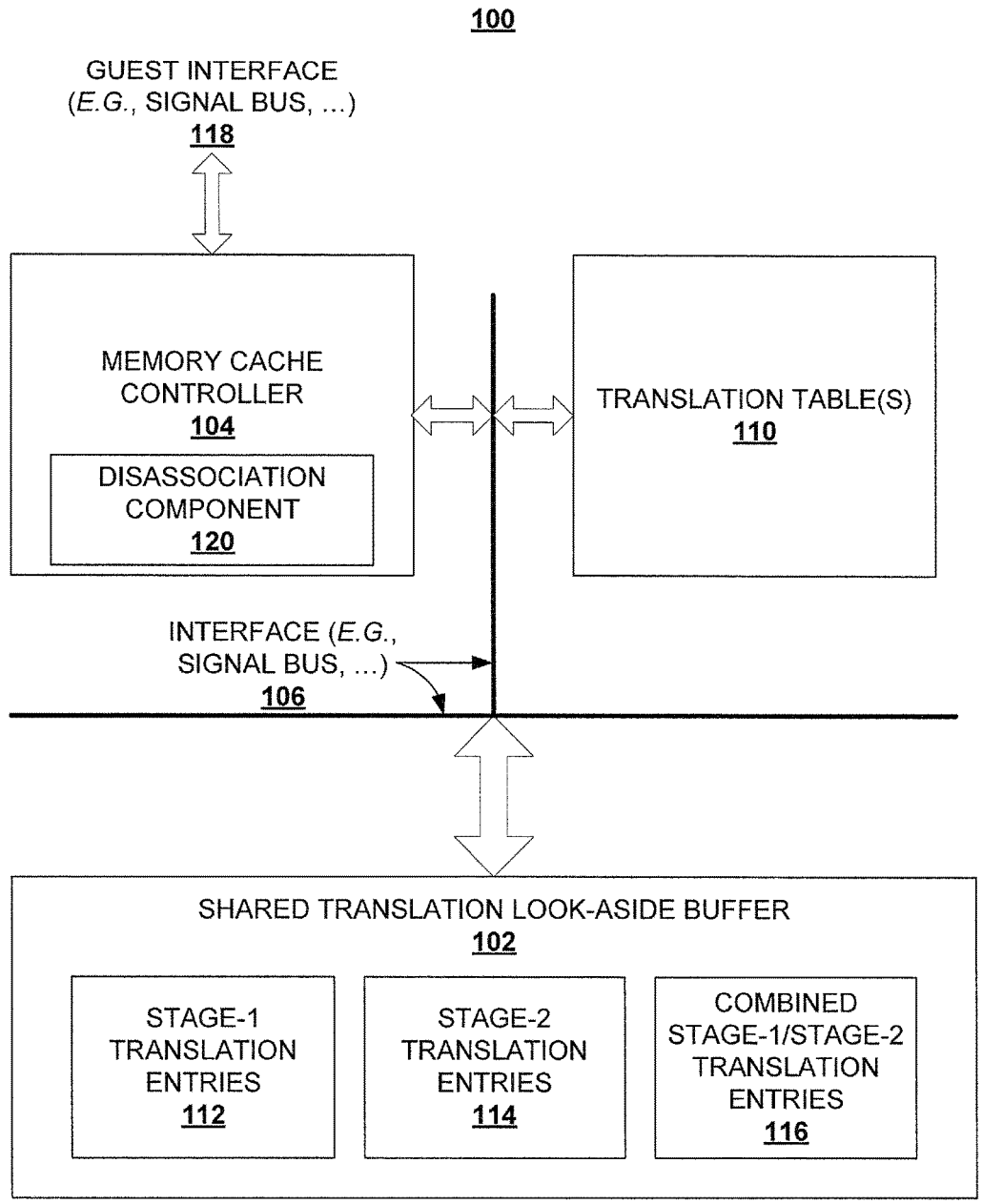
FIG. 1 depicts a block diagram of a sample system comprising a shared translation look-aside buffer (TLB) in one or more disclosed aspects.

As utilized herein, terms "component," "system," and the like are intended to refer to an electronic or computing entity, either hardware, software (e.g., in execution), or firmware. For example, a component can be one or more transistors, memory devices, memory cells, a gate array, a programmable gate array, an application specific integrated circuit, a controller, an arrangement of memory devices, a circuit, data transfer or integration circuitry, an electronic clock, a process running on a processor, a processor, an object, a state machine, a computer, etc. By way of illustration, a circuit, a memory, a memory device, a memory module, a cache, a transistor array electrically connected with the circuit, a controller that manages data flow between the transistor array and the circuit, an executable instruction, a set or sequence of executable instructions, a bus, a signal bus, a data bus, a communication bus, an interface, a signal interface, or the like, or a suitable combination thereof, can be a component. The component can include erasable programming (e.g., process instructions at least in part stored in erasable memory) or hard programming (e.g., process instructions burned into non-erasable memory at manufacture). Furthermore, an apparatus can comprise one or more components that operate together as a system. For instance, the apparatus can comprise an arrangement of electronic hardware, data transfer circuits, logical control circuits, memory circuits that store processing instructions, and a processing circuit that implements the processing instructions in a manner suitable to perform an electronic or computing task.

According to further illustrative examples, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

Address space virtualization is a characteristic of modern volatile memory architectures enabling a host (e.g., a host application, a host process, a host device, and so forth) to reference data with a host addressing scheme (e.g., a virtual address space), and a system controller (e.g., a memory management unit) to reference the data with another addressing scheme (e.g., a non-virtual address space). A memory architecture supporting a virtual address space for at least a subset of processes operating on a system is referred to as a virtualized system. In a non-virtual address space, a physical address (PA) of a particular location in physical memory can be mapped—or translated—to a single other address, called a virtual address (VA). This mapping of a VA to a PA is also referred to herein as a stage-1 address translation, or a stage-1 translation. In the virtualized system, the PA can be mapped to multiple other addresses. As one example, in a stage-2 address translation system, the PA can be mapped to an intermediate physical address (IPA), which in turn is mapped to the VA.

Cache memory can be employed to store address translations (e.g., VA to PA translations, VA to IPA translations, IPA to PA translations, and so forth) in a memory that can be quickly accessed by a processing device. This cache memory is referred to herein as a translation look-aside buffer (TLB). When a process fails to find a set of data stored in cache memory, the process accesses system main memory to acquire the set of data. To do so, a location in which the set of data is stored within the main memory—the PA associated with the set of data—is first acquired by the process. The TLB stores PAs for subsets of data stored in main memory, to mitigate or avoid having to access main memory to retrieve the PA for the set of data. Because cache memory is generally much more quickly accessed than main memory, the TLB can improve system performance with respect to acquiring locations of data stored in main memory.

The inventors of the disclosed subject matter are cognizant of TLB systems utilizing separate physical structures for storing different types of address translations. For instance, such TLB systems might utilize one physical cache structure to store stage-1 address translations, a second physical cache structure to store stage-2 address translations, and a third physical cache structure to store combined stage-1 and stage-2 address translations. Moreover, the inventors are aware of TLB systems that utilize still other separate cache structures for storing address translations of different page sizes for each address translation type. Thus, as an illustrative example, such a TLB system might include three separate cache structures for respective ones of the above types of address translations having a first page size, three additional cache structures for the above types of address translations having a second page size, and so on. The inventors therefore believe that as TLB systems incorporate more functionality, the physical layout of multiple cache structures on a processing board can become very onerous and difficult to manage. Moreover, management of multiple physical cache structures for different types of address translations or associated page sizes can complicate memory control function, leading to system inefficiencies. To address these and related problems, the subject disclosure provides for a shared TLB in which address translations of multiple address translation types or multiple page sizes can be cached in a single physical structure.

FIG. 1 illustrates a block diagram of an example memory system 100 comprising a shared TLB 102. Shared TLB 102 can be configured to cache (e.g., or store) memory address translations having multiple address translation types, in a single physical memory structure. In some embodiments of the subject disclosure, shared TLB 102 can be configured to store memory address translations of different page sizes in the single physical memory structure. Storing address translations in the single physical memory structure can facilitate reduced layout complexity for memory systems, as well as improved efficiency in accessing and retrieving cached memory address translations.

As depicted, memory system 100 can comprise shared TLB 102 configured to communicate with a memory cache controller 104 via a communication interface 106 (e.g., a signal bus, a data bus, and so on). Communication interface 106 can convey instructions, commands, data, and the like among entities connected to communication interface 106. As one example, communication interface 106 can facilitate transfer of instructions or commands to shared TLB 102, storage of memory address translations at shared TLB 102, retrieval of stored memory address translations at shared TLB 102, or the like.

Memory cache controller 104 can be configured to manage the storage of address translations at shared TLB 102. Further, memory cache controller 104 can be configured to receive requests for main memory addresses related to data stored in a main memory (not depicted—but can be represented by translation tables 110 in some embodiments) associated with memory system 100. Requests for main memory addresses can be received from various processes operating in conjunction with memory system 100. These processes can operate at one of a set of privilege levels. In a non-virtualized environment, a single privilege level can be provided, with a single level of address translation. In a virtualized environment, multiple levels of address translations can be stored at shared TLB 102, where a guest processing privilege level interacts with a simplified addressing scheme. The guest processing privilege level can utilize an address space comprising virtual addresses and intermediate physical addresses, wherein the guest processing privilege level observes intermediate physical addresses as physical address. The hypervisor privilege level can utilize a high-level address space in which virtual addresses are transformed directly to physical addresses of main memory. Memory cache controller 104 can receive address requests from the guest privilege level over guest interface 118 (e.g., a bus, a data bus, a signal bus, a communication interface, and so on) or the hypervisor privilege level, and look for, store or retrieve suitable address translations (VAs, IPAs, PAs) to serve address translation requests at the guest privilege level or at the hypervisor privilege level.

In response to receiving a request, memory cache controller 104 can reference shared TLB 102 to determine whether a target memory address (e.g., a physical address, an intermediate physical address) or an intermediate address translation related to the target memory address (e.g., a virtual memory address, an intermediate physical address) is located within shared TLB 102. If the target memory address is identified within shared TLB 102, the target memory address can be retrieved from shared TLB 102 and forwarded by memory cache controller 104 in response to the received request. If the target memory address is not stored within shared TLB 102, memory cache controller 104 can reference translation tables 110 to retrieve the target memory address (e.g., conducting a table-walk to identify the target main memory address—see FIGS. 3 and 4, infra).

Once a memory address is retrieved from translation tables 110, the retrieved memory address or a suitable translation of the retrieved memory address can be stored in shared TLB 102. Memory cache controller 104 can comprise one or more management policies (not depicted, but see FIG. 2, infra) establishing rules for when a memory address is stored in shared TLB 102, where within shared TLB 102 the memory address is stored, whether the memory address is stored as a physical address, intermediate physical address or virtual address, or a suitable combination thereof, and a replacement policy for ejecting previously stored memory addresses in lieu of memory address recently retrieved from translation tables 110. In various embodiments of the subject disclosure, memory addresses stored in translation tables 110 can be mapped to respective locations within shared TLB 102 by a mapping policy. Memory cache controller 104 can employ, for instance, a direct-mapped mapping policy in some embodiments, a set-associative mapping policy in further embodiments, or a fully associative mapping policy in still other embodiments. For set-associative mapping, one or more hashing functions can be employed by memory cache controller 104 for distinguishing memory addresses stored in shared TLB 102, distributing the physical location of memory addresses stored in shared TLB 102, or the like, or a suitable combination thereof (e.g., see FIG. 2, infra).

Accessing and retrieving memory addresses from shared TLB 102 is generally much faster than retrieving target memory addresses from translation tables 110, however, and thus memory cache controller 104 references shared TLB 102 first in response to the received request. As depicted, shared TLB 102 can be configured to store multiple types of address translations. These stored address translation types include stage-1 address translation entries 112. Stage-1 address translation entries 112 can include VA to PA hypervisor privilege level address translations, VA to PA address translations for a non-virtualized address space (e.g., where virtual address translations are disabled with respect to memory system 100; see, e.g., disassociation component 102, below), or VA to IPA guest privilege level address translations, as some suitable examples. The stored address translation types can further include stage-2 address translation entries 114, which can comprise IPA to PA guest privilege level address translations, as an example. Moreover, the stored address translation types can further include combined stage-1 and stage-2 address translation entries 116, which can comprise VA to PA guest privilege level address translations, for instance.

According to one or more additional embodiments of the subject disclosure, memory cache controller 104 can be configured to selectively enable or disable virtualized address caching for memory system 100. For instance, memory cache controller 104 can comprise a disassociation component 102 configured to selectively disable one or more memory address translation types that can be employed by memory system 100. As one example, disassociation component 120 can be configured to selectively disable stage-2 hypervisor memory address translations and the hypervisor privilege level. In this example, memory cache controller can be configured to enable a guest operating system privilege level to utilize TLB 102 for virtual address to physical address translation entries. In an alternative or additional example, disassociation component 120 can be configured to disable stage-1 guest address translations and the guest operating system privilege level. According to this example, the hypervisor privilege level can be configured to employ the full structure of TLB 102 for intermediate physical address to physical address memory translation entries. Further to the above, disassociation component 120 can be configured to re-activate a disabled memory address translation type(s). This can, for instance, enable memory cache controller 104 to utilize a previously disabled stage-1 guest memory address translations and guest operating system privilege level, or to utilize a previously disabled stage-2 hypervisor memory address translations and hypervisor privilege level, as suitable. Thus, disassociation component 120 can be configured to disable a fully virtual environment comprising stage-1 memory address translations combined with stage-2 memory address translations, or re-initiate such an environment after it is disabled.

Figure 2:
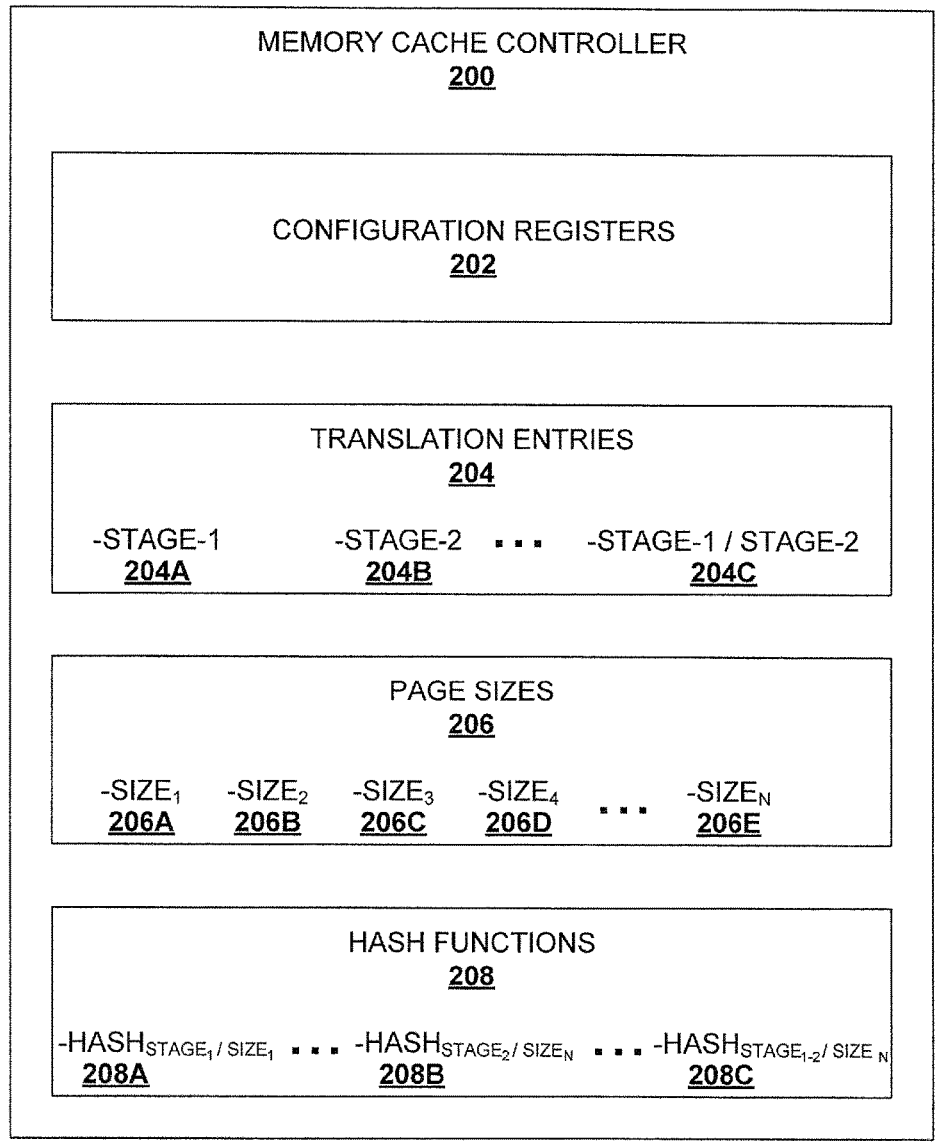
FIG. 2 illustrates a block diagram of a sample memory cache controller configured to operate with a shared TLB according to the disclosure.

FIG. 2 depicts a block diagram of an example memory cache controller 200 according to one or more additional aspects of the subject disclosure. In some disclosed aspects, memory cache controller 200 can be substantially similar to memory cache controller 104. In alternative or additional aspects, memory cache controller 200 can have a suitable subset of the features of memory cache controller 104, or additional features described herein.

Memory cache controller 200 can be configured to store translations of main memory addresses—or address translation entries—in a cache structure. For example, the cache structure can be a single physical cache memory, such as a shared TLB (see shared TLB 102, supra). Further, memory cache controller 200 can be configured to store differing types of address translation entries within the cache structure. Memory cache controller 200 can reference a set of configuration registers 202 comprising rules related to management (e.g., storage, look-up, retrieval, replacement, and so forth) of the differing types of translation entries 204. The translation entries 204 can include stage-1 address translation entries 204A, stage-2 translation entries 204B, combined stage-1 and stage-2 translation entries 204C, or the like. Configuration registers 202 can further comprise rules for identifying an address translation suitable for a request depending on a privilege level of a process transmitting the request (e.g., a guest privilege level utilizing a virtual address space, a hypervisor privilege level).

In addition to the foregoing, memory cache controller 200 can be configured to support a plurality of a set of page sizes 206 for one or more of the differing types of address translation entries 204. Set of page sizes 206 can include page size$_1$ 206A, page size$_2$ 206B, page size$_3$ 206C, page size$_4$ 206D, . . . through page size$_N$ 206E, where N is a suitable integer larger than 1. Memory cache controller 200 can support a subset(s) of set of page sizes 206 for one or more of the differing types of address translation entries 204. In some aspects, the same subset(s) of set of page sizes 206 can be supported for respective ones of translation entries 204. In other aspects, memory cache controller 200 can support different subsets of set of page sizes 206 for respective ones of translation entries 204. Respective translation entries 204 of any suitable one of set of page sizes 206 can be stored in the single cache structure (e.g., the shared TLB). Examples of suitable page sizes can include 16 gigabyte (GB), 1 GB, 512 megabyte (MB), 32 MB, 16 MB, 2 MB, 1 MB, 64 kilobyte (KB), or 4 KB, or the like, or suitable combinations thereof. In some embodiments, the foregoing page sizes can be applicable to VA to PA memory address translation entries. Examples of other suitable page sizes can include 16 GB, 1 GB, 512 MB, 32 MB, 2 MB, 64 KB, or 4 KB, or the like, or a suitable combination thereof. These latter page sizes can be employed, as one example, for IPA to PA memory address translation entries.

Memory addresses can be mapped to locations within the cache structure according to an association policy(ies) maintained by configuration registers 202. In some embodiments, memory cache controller 200 can employ a fully associative policy. In other embodiments, memory cache controller 200 can employ a set-associative policy (e.g., an X-way set-associative policy, where X is a suitable positive integer). One or more replacement policies stored within configuration registers 202 can be configured to determine when to eject a prior memory address stored in the single cache structure in favor of a memory address recently retrieved from a table walk of a main memory device (not depicted).

In the case of the set-associative policy, one or more hash functions 208 can be employed in conjunction with storing address translations to the cache structure. In an embodiment, hash functions 208 can comprise a set of base hashing functions. A base hashing function can determine a set address for a particular address translation, based at least in part on a page size 206 or a type of translation entry 204 used for the address translation. Thus, a first hash function 208A can be employed for a stage-1 translation entry 206A having a first page size 206A, a second hash function 208B can be employed for a stage-2 address translation entry 204B having an Nth page size 206E, while a Zth hash function 208C (where Z is a suitable integer greater than 1) can be employed for a combined stage-1 and stage-2 address translation entry 204C having the Nth page size 206E, and so forth for different combinations of address translation entries 204 and page sizes 206. The base hashing function(s) can be configured to mitigate aliasing of different page size translations to the same set.

In one or more additional embodiments of the subject disclosure, hash functions 208 can also include a set of secondary hashing functions. A secondary hashing function(s) can be applied to a set of address translations to distribute respective address translations throughout the single cache structure. For instance, the secondary hashing function can be configured to distribute address translations throughout the cache structure according to a function (e.g., a random distribution, pseudo-random distribution, or other suitable distribution function). According to other embodiments, hashing functions 208 can include a set of secondary hashing functions that are respectively applied for the different types of address translation entries 204. Thus, one secondary hashing function can be utilized for stage-1 translation entries, another secondary hashing function for stage-2 translation entries, a third secondary hashing function for combined stage-1 and stage-2 translation entries, and so on.

In operation, memory cache controller 200 can be configured to cache address translations requested by a system process or processor. As described herein, memory cache controller 200 can be configured to cache a plurality of types of address translation entries 204 in the single cache structure. Note that in at least one embodiment, memory cache controller 200 can forego caching of a final level of an IPA->PA address mapping (e.g., that returns a target PA associated with a target set of data in main memory). In additional embodiments, virtualization can be enabled to allow memory cache controller 200 to implement stage-2 address translations and combined stage-1 and stage-2 address translations. In at least one embodiment, stage-2 translations can be disabled and stage-1 address translations can be employed to map a VA(s) directly to corresponding PA(s).

Figure 3:
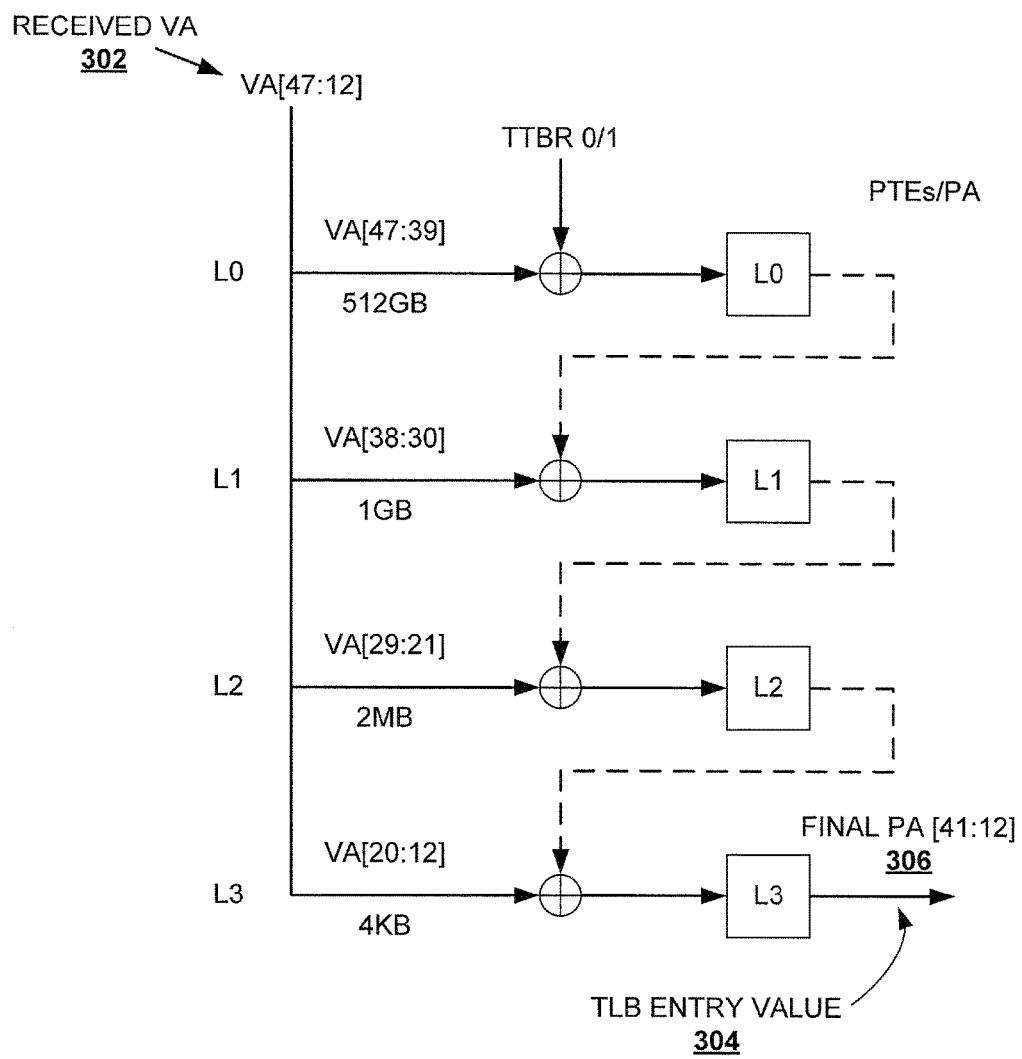
FIG. 3 illustrates a diagram of a sample system memory table walk for a stage-1 memory translation according to an aspect.

FIG. 3 illustrates a diagram of an example stage-1 table walk 300 for retrieving a final PA 306 associated with a VA. The final PA 306 can be an IPA in some disclosed embodiments (e.g., in a virtualized environment), and thus may not directly identify a location within main memory in which a target set of data is stored. In other embodiments, the final PA 306 can directly identify the location within main memory of the target set of data (e.g., in a non-virtualized environment, in association with a hypervisor privilege level address translation, or the like).

Stage-1 table walk 300 is operable when virtualization is disabled (e.g., no stage-2 address translation/mapping), in some embodiments. In additional embodiments, stage-1 table walk 300 can be operable for a hypervisor privilege level having virtual memory addresses mapped to physical memory addresses. As depicted, stage-1 table walk 300 initiates with receipt of a VA 302 (received VA 302) in conjunction with a request for an address translation associated with received VA 302. Stage-1 table walk 300 comprises a series of translation levels L0, L1, L2 and L3 between received VA 302 and final PA 306. Once final PA 306 is retrieved following translation level L3, a reply is sent in response to the request for the address translation containing final PA 306. Moreover, final PA 306 can be stored in a shared TLB for later reference (e.g., in accordance with a replacement policy employed for the shared TLB). In at least one embodiment, the L3 address utilized to derive final PA 306 can be stored (e.g., in accordance with the replacement policy) as a TLB entry value 304 in the shared TLB.

Figure 4:
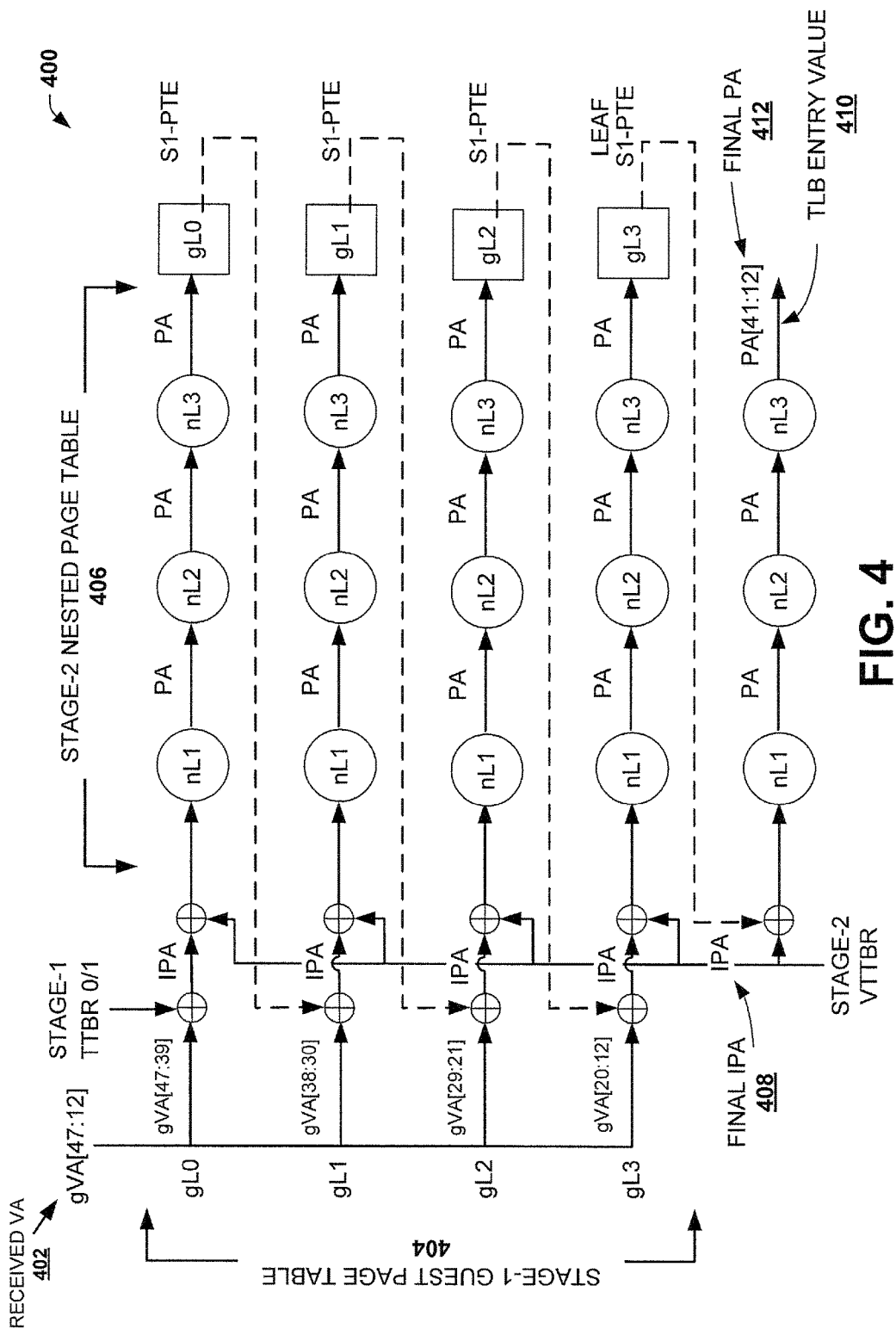
FIG. 4 depicts a diagram of an example system memory table walk for a stage-2 memory translation according to a further aspect.

FIG. 4 illustrates a diagram of an example combined stage-1 and stage-2 table walk (also referred to as a multi-stage table walk) 400 according to additional embodiments of the subject disclosure. In general, a multi-stage table walk can comprise one or more VA to IPA translations vertically along a stage-1 guest page table 404, as well as one or more IPA to PA translations horizontally along a stage-2 nested page table 406. Multi-stage table walk 400 of FIG. 4 is an example of a table walk that includes four VA to IPA translations along the vertical direction, and four nested IPA to PA translations that progress horizontally for each vertical step. For instance, respective rows of multi-stage table walk 400 correspond to one of a set of levels of stage-1 address translation, while respective columns of multi-stage table walk 400 correspond to one of a second set of levels of stage-2 address translation. A final PA 412 results from nested table walk 400, which can be stored as a TLB entry value 410.

In the example of FIG. 4, there are depicted four levels of stage-1 address translation, and four levels of stage-2 address translation. In other embodiments, a multi-stage table walk can have different numbers of stage-1 address translations or nested stage-2 address translations. In the latter case, the multi-stage table walk will have a different number of horizontal or vertical steps in the address translation. A two-dimensional table walk scheme such as multi-stage table walk 400 having m levels for stage-1 and n levels for stage-2 (where m and n are suitable positive integers) comprises a number of page table entry memory references defined by the following equation:

$$N_{references}=m*n+n+m.$$

Thus, multi-stage table walk 400 having an m=4 and an n=3, has a number of memory references $N_{references}=19$.

Note that an IPA generated in response to a stage-1 address translation (e.g., vertical address translation, gL0, gL1, . . . ) that outputs the IPA in response to a provided VA, can involve a corresponding stage-2 nested translation (e.g., one of the address translations along the horizontal direction, nL0, nL1, . . . ), where the stage-2 nested translation outputs a PA associated with the IPA. Multi-stage table walk 400 of FIG. 4 illustrates stage-2 nested translation mappings as circles. Once an IPA->PA mapping is obtained, the page table entry for the corresponding stage-1 level (S1-PTE) can be read from memory. The corresponding stage-1 levels are represented by squares in multi-stage table walk 400. Respective page table entry read requests instituted by a guest operating system are combined with a subsequent virtual address of the stage-1 guest page table 404, producing a new IPA. IPAs that are not equal to a final IPA 408 will again require a stage-2 nested translation. Multi-stage table walk 400 can end after completing the stage-2 table walk associated with the last level guest page table entry (e.g., the fourth level VA->PA, or another suitable nested translation that produces a final PA for another suitable multi-stage table walk). This stage-2 table walk produces a final stage-2 physical address 412.

The virtual address and the final mapping of VA->PA can be cached in a shared TLB (e.g., shared TLB 102) as indicated by TLB entry value 410. The intermediate physical address and physical address results in each row of multi-page table walk 400 can be cached in the shared TLB as IPA to PA mappings. Note that in one embodiment of the subject disclosure, for the last level of the guest page table entry, no IPA->PA mapping is cached in the shared TLB, since the VA->PA mapping identifying this PA is already cached. The subject disclosure is not limited to this embodiment, however.

In progressing along multi-stage table walk 400, a stage-1 lookup hit enables the table walk to advance to a higher guest address translation level (gL) by producing a guest translation entry. In multi-stage table walk 400, this corresponds to moving down to a higher number gL row(s); for example, moving from gL0 to gL1, from gL1 to gL2, and so on. If an IPA->PA translation is performed, a lookup to the shared TLB can be conducted. If the lookup misses in the shared TLB but hits in a page walk cache (PWC), for instance, multi-stage table walk 400 can advance to a higher nested address translation level (nL) by producing a nested translation entry. In multi-stage table walk 400, this corresponds to advancing horizontally to a higher nL column(s); for example advancing from nL1 to nL2, from nL2 to nL3, and so forth. A physical address obtained from this nested translation entry can be used to generate a memory reference request to obtain a next translation level page table entry of the stage-2 table walk. Upon reaching the physical address corresponding with final PA 412, the multi-stage table walk 400 ends, and returns final PA 412 in response to an address translation request initiating multi-stage table walk 400.

Figure 5:
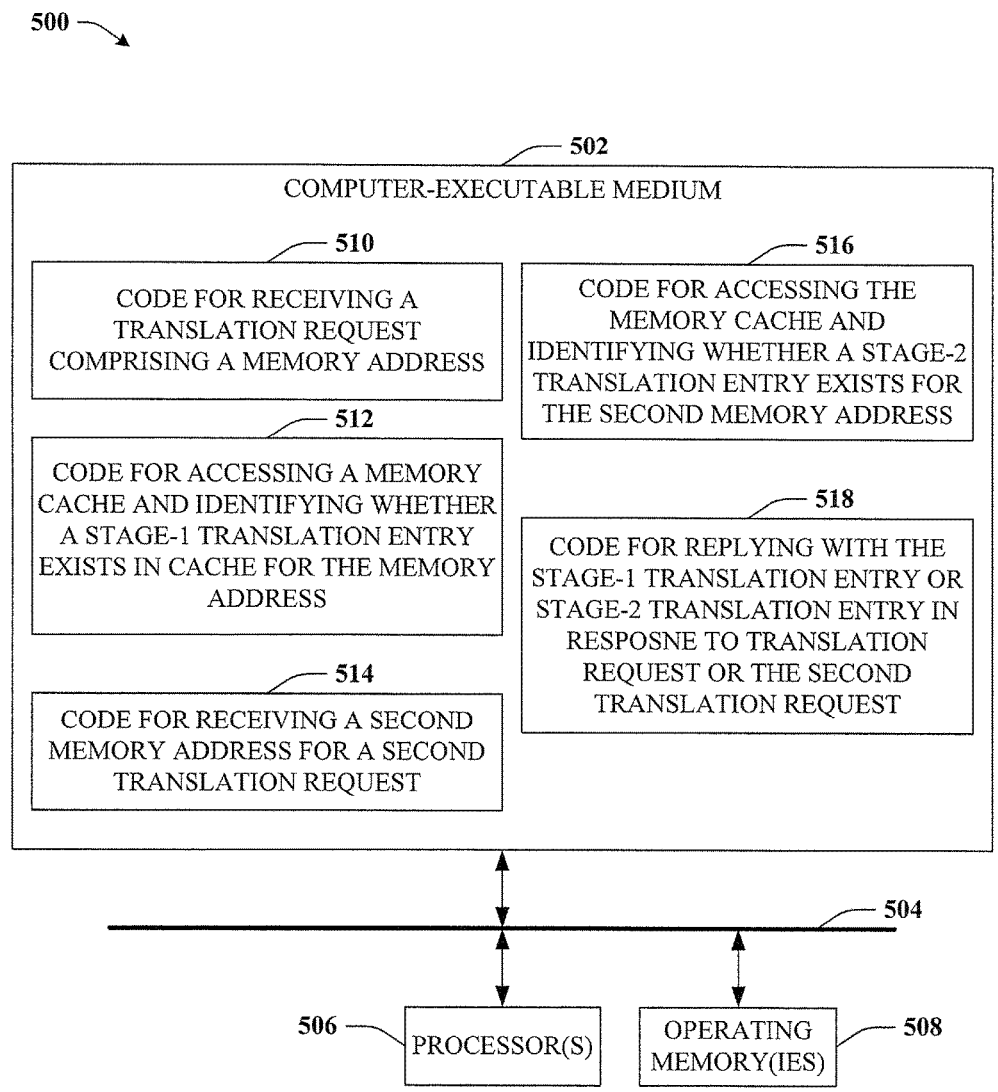
FIG. 5 illustrates a block diagram of an example apparatus configured to perform a cache lookup for a shared TLB, in an embodiment(s).

FIG. 5 illustrates a block diagram of an example apparatus 500 for implementing one or more aspects of the subject disclosure. Particularly, apparatus 500 can be configured for facilitating caching of different types of address translations, and optionally different page sizes, at a single TLB memory structure (a common TLB). For instance, apparatus 500 can reside at least partially within an electronic device, a memory, a memory module, a handheld computer, a personal computer, a networked computer, or the like. It is to be appreciated that apparatus 500 is represented as including functional blocks, which can be functional blocks that represent functions implemented by a hardware, software, or combination thereof (e.g., firmware). In some aspects, the functional blocks can represent non-transitory computer-readable media. In other aspects, the functional blocks can represent transitory computer-readable media.

Apparatus 500 can comprise an electronically executable component 502 comprising code for operating a common TLB comprising multiple address translation types, multiple page sizes, or a combination thereof. Further, apparatus 500 can be configured for performing a memory translation at least in part utilizing stored address translations from the common TLB. In various embodiments, electronically executable component 502 can be operated, executed or accessed over a data communication interface 504. Data communication interface 504 can include a data bus, a dataline, a bitline, a wired or wireless communication interface, or the like, or a suitable combination thereof. In at least one aspect of the subject disclosure, a subset of the code, instructions, or the like for operating the common TLB or performing memory translations utilizing the common TLB, can include computer-executable instructions stored in an operating memory(ies) 608 or executed by a processor(s) 606 to facilitate functionality of apparatus 500.

As depicted, electronically executable component 502 can comprise code 510 for receiving a translation request comprising a memory address. At 512, electronically executable component 502 can comprise code for accessing the common TLB and identifying whether a memory address translation entry of a first virtualization type exists for the memory address within the shared TLB. Suitable examples of the first virtualization type can include, but are not limited to the following: a stage-1 VA->PA non-virtualized address translation, a stage-1 VA->IPA guest privilege level address translation, a stage-1 VA->PA hypervisor privilege level address translation, a combined stage-1 and stage-2 VA->PA guest privilege level address translation, or a stage 2 IPA->PA guest privilege level address translation, or the like. The code 512 can further include code for providing the memory address translation entry of the first virtualization type in response to identifying existence of the memory address translation entry in reply to receiving the translation request, to satisfy the translation request. Furthermore, electronically executable component 502 can comprise code 514 for receiving a second memory address for a second translation request, and code 516 for accessing the shared TLB and identifying whether a second memory address translation entry of a second virtualization type (e.g., a second one of the foregoing example address translation types) exists for the second memory address within the shared TLB. In response to the second translation request, electronically executable component 502 can include code 518 for providing the second memory address translation entry of the second virtualization type in response to identifying existence of the second memory address translation entry of the second virtualization type within the shared TLB, to satisfy the second translation request.

The aforementioned diagrams have been described with respect to interaction between several components, or memory architectures. It should be appreciated that such diagrams can include those components and architectures specified therein, some of the specified components/architectures, and/or additional components/architectures. Sub-components could also be implemented as electrically connected to other sub-components rather than included within a parent architecture. Additionally, it should be noted that one or more disclosed processes could be combined into a single process providing aggregate functionality. For instance, a program process can comprise an erase process, or vice versa, to facilitate programming and erasing a memory by way of a single process. In addition, it should be appreciated that respective rows, sub-blocks, blocks, etc., can be written to, read, erased, or the like individually in as an aggregate. Components of the disclosed architectures can also interact with one or more other components not specifically described herein but known by those of skill in the art.

Figure 6:
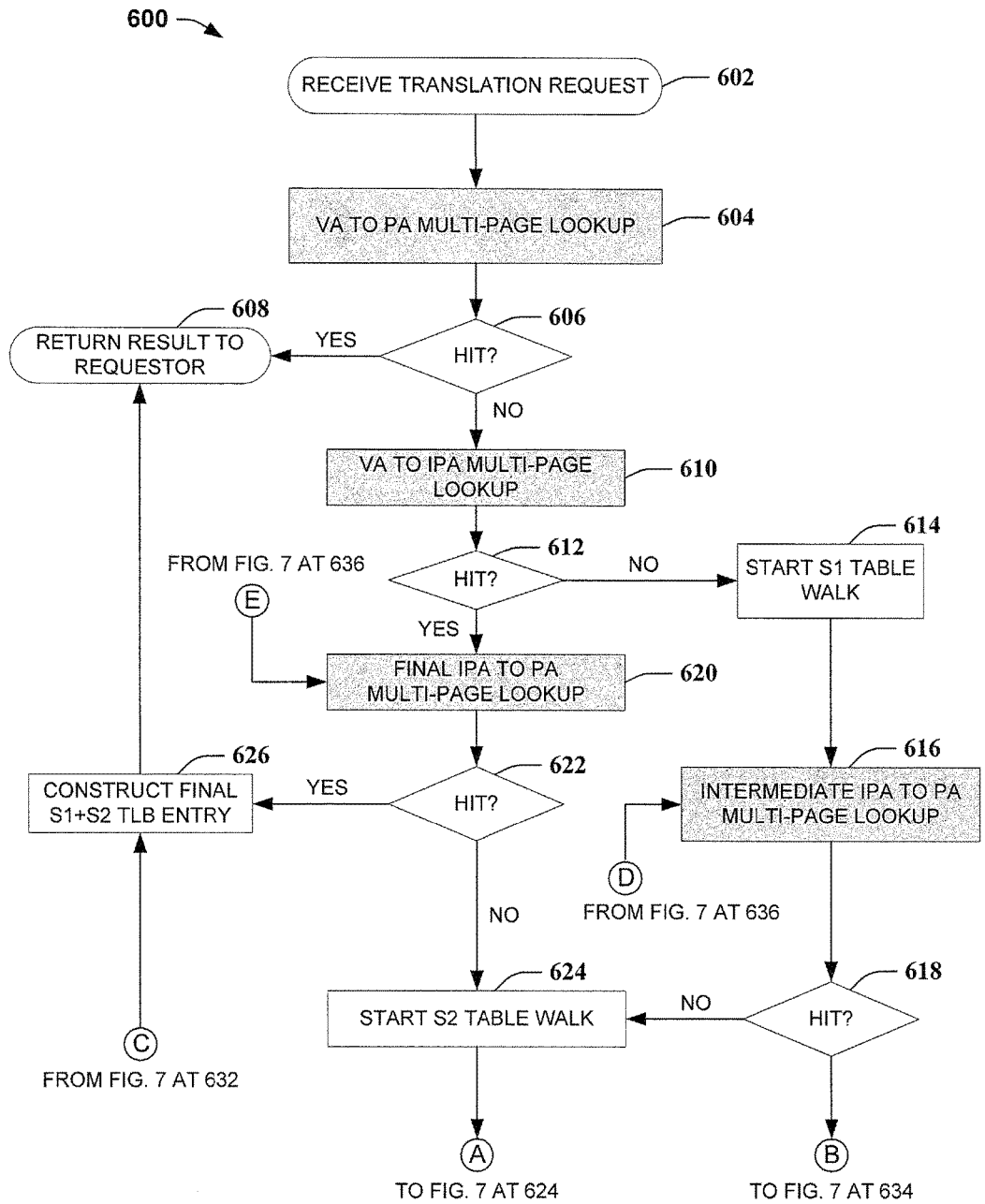
FIGS. 6 and 7 illustrate a flowchart of an example method of performing a cache lookup for a shared TLB according to the present disclosure.
Figure 7:
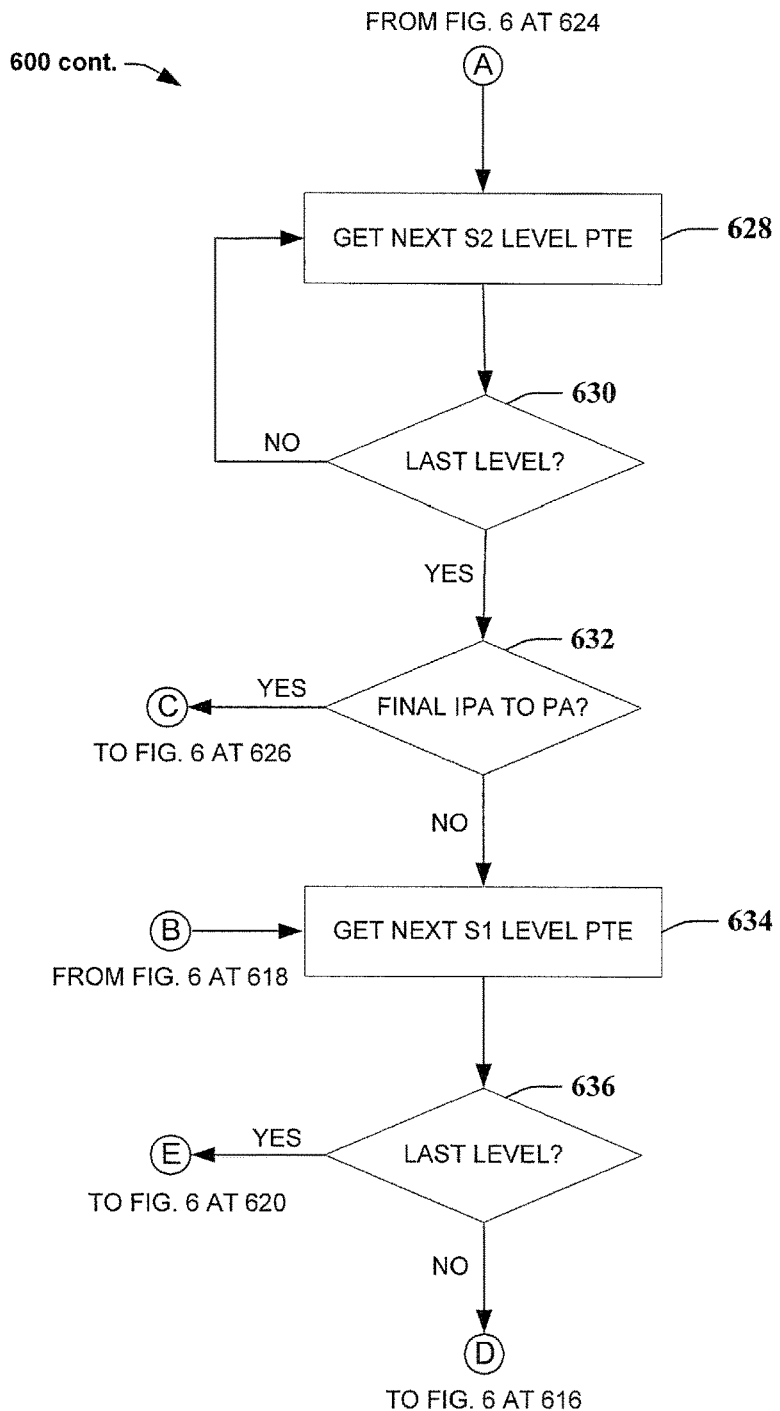
Figure 8:
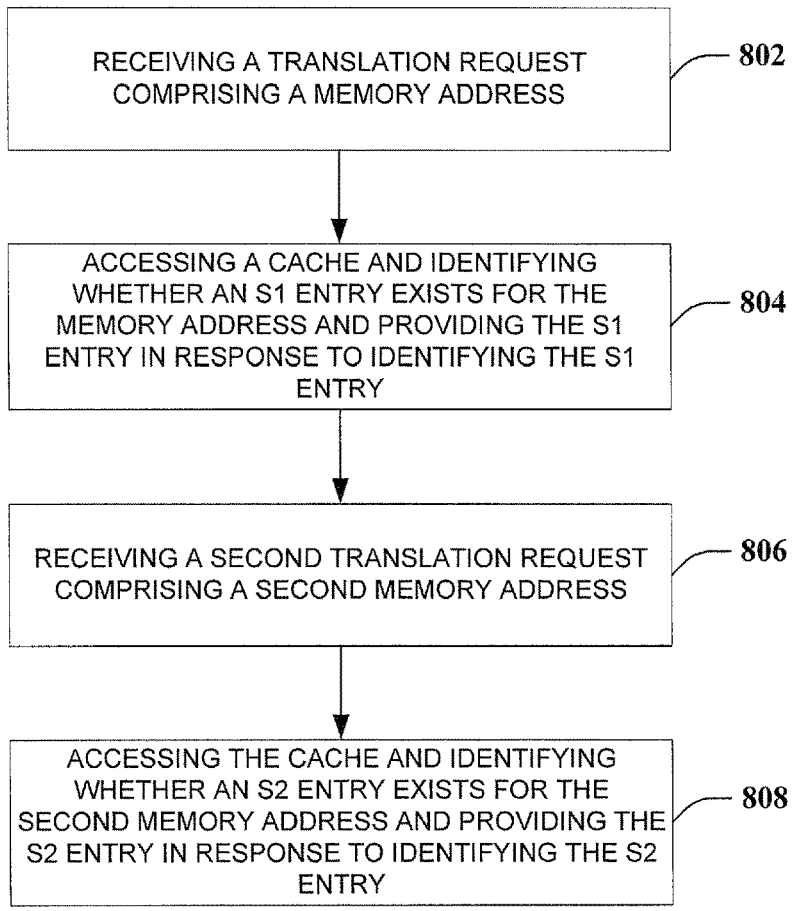
FIG. 8 depicts a flowchart of a sample method for operating a shared TLB according to one or more additional aspects of the disclosure.

In view of the exemplary diagrams described supra, process methods that can be implemented in accordance with the disclosed subject matter will be better appreciated with reference to the flow charts of FIGS. 6 through 8. While for purposes of simplicity of explanation, the methods of FIGS. 6 through 8 are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, it should be further appreciated that the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

FIGS. 6 and 7 illustrate a flowchart of an example method 600 for operating a shared TLB configured to store address translations of different translation types, having different page sizes, or the like, or a suitable combination thereof. At 602, method 600 can comprise receiving a translation request for a memory address space of a computing system. The translation request can comprise a VA associated with the memory address space. At 604, method 600 can comprise performing a VA->PA multi-page lookup at the shared TLB. At 606 a determination is made as to whether the VA->PA multi-page lookup results in a hit or a miss at the shared TLB. If a hit for the PA occurs, method 600 can proceed to 608 where the PA result is returned to a requesting entity. If the VA->PA multi-page lookup to the shared TLB results in a miss for the PA, method 600 can proceed to 610.

At 610, method 600 can comprise performing a VA->IPA multi-page lookup for an IPA associated with the VA. At 612 a determination is made as to whether the VA->IPA multi-page lookup results in a hit or a miss at the shared TLB for the IPA. If the hit occurs, method 600 can proceed to 620; otherwise method 600 can proceed to 614.

At 614, method 600 can comprise initiating a stage-1 table walk. At 616, an IPA->PA multi-page lookup can be performed. At 618, a determination is made as to whether the IPA->PA multi-page lookup results in a hit or a miss for the PA at the shared TLB. If the hit occurs at 618, method 800 can proceed to FIG. 7 at reference number 634. Otherwise, if the miss occurs at reference number 618, method 600 can proceed to 624 and initiate a stage-2 table walk. From 624, method 600 can proceed to FIG. 7 at 628.

At reference number 620, method 600 can respond to a hit with respect to the VA->IPA multi-page lookup of reference number 610 with a final IPA to PA multi-page lookup. A determination can be made at 622 as to whether the final IPA to PA multi-page lookup receives a hit or a miss at the shared TLB. In response to a hit, method 600 can proceed to 626 and construct a final stage-1 and stage-2 TLB entry for the received translation request, and proceed to 608 and return a result to the requestor. Otherwise, if a miss is determined at reference number 622, method 600 can proceed to 624 and initiate a stage-2 table walk. As mentioned above, from 624, method 600 can proceed to FIG. 7 at reference number 628.

Referring now to FIG. 7, method 600 continues at 628, where a subsequent level stage-2 page table entry (PTE) is acquired. At 630, a determination is made as to whether the subsequent level stage-2 PTE is a last level in the stage-2 table walk. If not, method 600 returns to 628; otherwise method 600 can proceed to 632.

At 632, a determination is made as to whether a final IPA->PA translation has been acquired. If so, method 600 can proceed to FIG. 6 at 626. Otherwise method 600 proceeds to 634.

At 634, method 600 can acquire a next level stage-1 PTE. At 636, a determination is made as to whether the next level stage-1 PTE acquired at reference number 634 is a last stage-1 level. If so, method 600 can return to reference number 620. Otherwise, method 600 can return to 616. Method 600 terminates at 608, either in response to a VA->PA multi-page lookup resulting in a hit at reference 604, a final IPA->PA multi-page lookup resulting in a hit at 620 and 622, enabling construction of a final stage-1 and stage-2 TLB entry and returning that entry to the requesting entity, or in response to a next stage-2 PTE being a final level at reference number 630 and a final IPA->PA table entry at reference number 632, enabling the construction of the final stage-1 and stage-2 TLB entry.

Method 800 illustrates a flowchart of an example method 800 for operating a shared TLB in one or more additional aspects of the subject disclosure. At 802, method 800 can comprise receiving a translation request comprising a memory address. At 804, method 800 can comprise accessing a memory cache and identifying whether a memory address translation entry of a first virtualization type exists for the memory address within the memory cache, and providing the memory address translation entry of the first virtualization type to satisfy the translation request, in response to identifying existence of the memory address translation entry of the first virtualization type within the memory cache. In addition to the foregoing, at 806, method 800 can comprise receiving a second memory address for a second translation request. At 808, method 800 can comprise accessing the memory cache and identifying whether a second memory address translation entry of a second virtualization type exists for the second memory address within the memory cache, and providing the second memory address translation entry of the second virtualization type to satisfy the second translation request in response to identifying existence of the second memory address translation entry of the second virtualization type within the memory cache.

Figure 9:
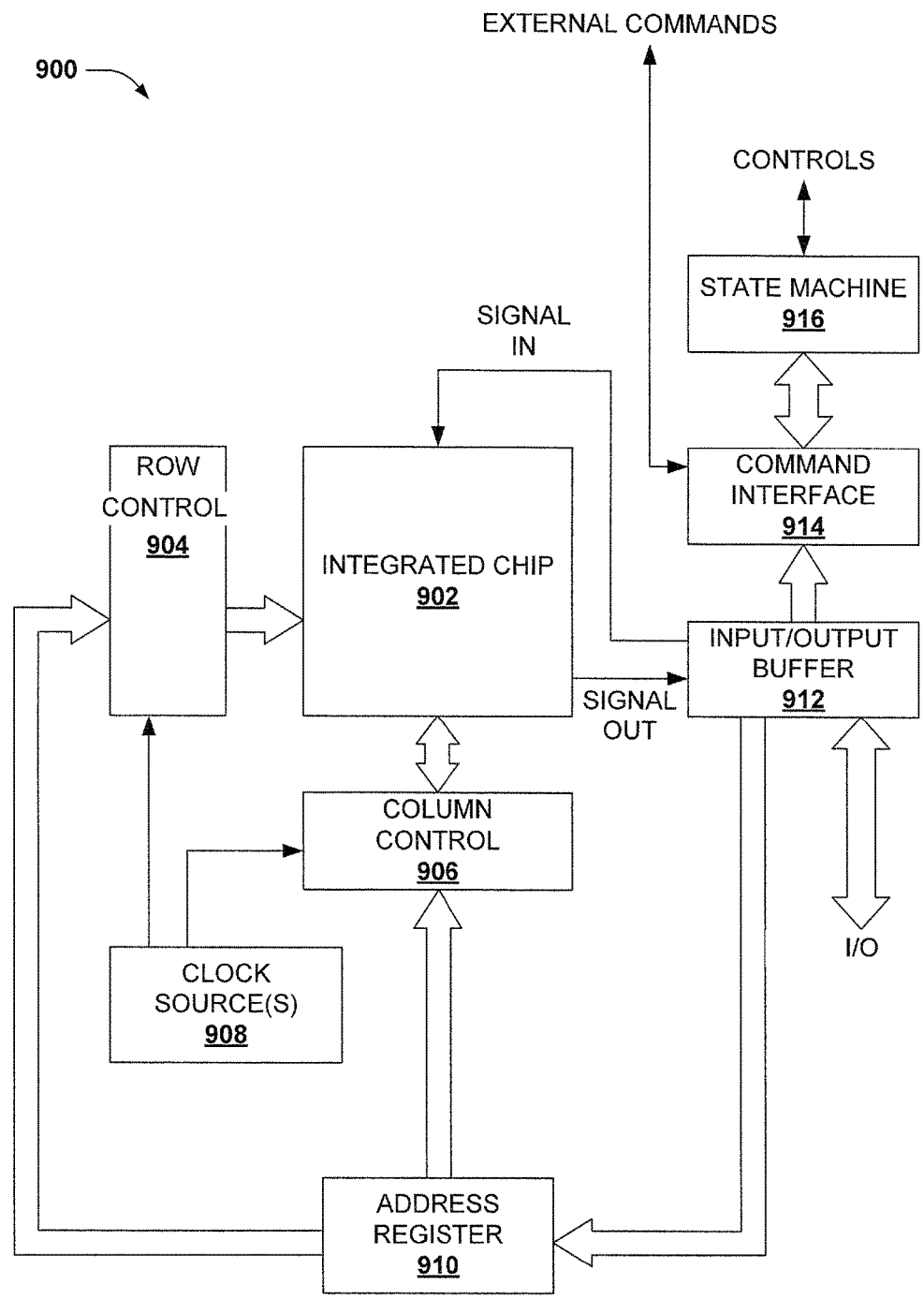
FIG. 9 illustrates a block diagram of an example computing system architecture to facilitate various aspects of the subject disclosure.

In order to provide a context for the various aspects of the disclosed subject matter, FIG. 9, as well as the following discussion, is intended to provide a brief, general description of a suitable environment in which various aspects of the disclosed subject matter can be implemented or processed. While the subject matter has been described above in the general context of digital electronic components and process methodologies for operating such components, those skilled in the art will recognize that the subject disclosure also can be implemented in combination with other digital or analog electronic components or process methodologies. Moreover, those skilled in the art will appreciate that the disclosed processes can be practiced with a processing system or a computer processor, either alone or in conjunction with a host computer, which can include single-processor or multiprocessor computer systems, mini-computing devices, mainframe computers, as well as personal computers, handheld computing devices (e.g., PDA, phone, tablet, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone electronic devices, such as a memory card, Flash memory module, removable memory, or the like. In a distributed computing environment, program modules can be located in both local and remote memory storage modules and devices.

FIG. 9 illustrates a block diagram of an example operating and control environment 900 for an integrated chip 902 according to aspects of the subject disclosure. In at least one disclosed aspect, integrated chip 902 can be configured to operate with a variety of operating system architectures (e.g., a 32-bit architecture, a 64-bit architecture, and so forth). Particularly, integrated chip 902 can be arranged to facilitate multi-stage address translation having respective encodings and page sizes utilizing a common buffer (e.g., a TLB or UTB, as described herein. It should be appreciated that control environment 900 is only one example of interfacing with and controlling integrated chip 900, and is not intended to limit the scope of the subject disclosure. Rather, other mechanisms, systems or architectures for control and communication with an integrated chip known in the art or made known to one of skill in the art by way of the context provided herein, are considered part of the subject disclosure.

A column controller 906 can be formed adjacent to integrated chip 902. Moreover, column controller 906 can be electrically coupled with a first set of data or control lines (e.g., bit lines, . . . ) of integrated chip 902. Column controller 906 can control respective ones of the first set of data or control lines, facilitating operation of one or more functions of integrated chip 902, providing program information for programmable portions of integrated chip 902, or the like.

In addition, operating and control environment 900 can comprise a row controller 904. Row controller 904 can be formed adjacent to column controller 906, and electrically connected with a second set of data or control lines (e.g., word lines, . . . ) of integrated chip 902. Row controller 904 can select or activate subsets of the second set of data or control lines to further facilitate operation of integrated chip 902. Thus, row controller 904 can operate alone or in conjunction with column controller 906 to facilitate operation of the one or more functions of integrated chip 902.

A clock source(s) 908 can provide respective clock pulses to facilitate timing for operations of row control 904 and column control 906. Clock source(s) 908 can further facilitate selection of subsets of the first set of control lines and the second set of control lines in response to external or internal commands received by operating and control environment 900. An input/output buffer 912 can be connected to an external host apparatus, such as a computer or other processing device (not depicted) by way of an I/O buffer or other I/O communication interface. In addition, input data can be transmitted to integrated chip 902 via signal input lines, and output data can be received from integrated chip 902 via signal output lines. Input data can be received from the host apparatus, and output data can be delivered to the host apparatus via the I/O buffer.

Commands received from the host apparatus can be provided to a command interface 914. Command interface 914 can be configured to receive external control signals from the host apparatus, and determine whether data input to the input/output buffer 912 is write data, a command, or an address. Input commands can be transferred to a state machine 916.

State machine 916 can be configured to manage programming and reprogramming of integrated chip 902. State machine 916 receives commands from the host apparatus via input/output interface 912 and command interface 914, and manages read, write, erase, data input, data output, and like functionality associated with integrated chip 902. In some aspects, state machine 916 can send and receive acknowledgments and negative acknowledgments regarding successful receipt or execution of various commands.

To implement functionality of integrated chip 902, state machine 916 can control clock source(s) 908. Control of clock source(s) 908 can cause output pulses configured to facilitate row controller 904 and column controller 906 implementing the particular functionality. Output pulses can be transferred to selected subsets of the first set of data or control lines by column controller 906 for instance, or to selected subsets of the second set of data or control lines by row controller 904, for instance.

Various aspects of the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
a memory cache controller configured to store, as a function of enabling or disabling virtualized address caching, multiple distinct types of memory address translation entries within a same physical memory cache, the multiple distinct types comprising at least one stage-1 translation entry, at least one stage-2 translation entry, and at least one combined stage-1 and stage-2 translation entry, wherein
the at least one stage-1 translation entry comprises a virtual address to physical address hypervisor memory address translation entry,
the at least one stage-2 translation entry comprises an intermediate physical address to physical address guest memory address translation entry, and
the at least one combined stage-1 and stage-2 translation entry comprises a virtual address to physical address guest memory address translation entry; and
an interface operably connected to the memory cache controller and configured to receive a first memory address and send a response comprising a second memory address retrieved from the memory cache by the memory cache controller,
wherein the memory cache controller is configured to determine the second memory address as a function of a failure of a first multipage lookup of the memory cache to identify a first mapping representing a virtual address to a physical address mapping for the first memory address, a failure of a second multipage lookup of the memory cache to identify a second mapping representing the virtual address to an intermediate physical address mapping for the first memory address, and a success of a third multipage lookup of the memory cache to identify a third mapping representative of the intermediate physical address to the physical address mapping for the first memory address; and wherein the memory cache controller is further configured to apply a base hashing function and a secondary hashing function to a memory address translation entry, the base hashing function applied to determine a set address of the memory address translation entry based on an associated page size and the secondary hashing function applied to map the memory address translation entry to the memory cache based on an associated distinct type of the memory address translation entry.

2. The system of claim 1, wherein the at least one stage-1 translation entry further comprises at least one a non-virtualized virtual address to physical address memory address translation entry.

3. The system of claim 1, wherein the at least one stage-1 translation entry further comprises at least one of a virtual address to physical address hypervisor memory address translation entry or a virtual address to intermediate physical address guest memory address translation entry.

4. The system of claim 1, wherein the at least one stage-1 translation entry further comprises at least one of a non-virtualized virtual address to physical address memory address translation entry or a virtual address to intermediate physical address guest memory address translation entry.

5. The system of claim 1, wherein the at least one stage-2 translation entry further comprises at least one a non-virtualized virtual address to physical address guest memory address translation entry.

6. The system of claim 1, wherein
the memory cache controller defines a guest operating system privilege level and a hypervisor privilege level, and
the guest operating system privilege level enables stage-1 virtual address to intermediate physical address memory translations and stage-2 intermediate physical address to physical address memory translations, and the hypervisor privilege level enables stage-1 virtual address to physical address memory translations.

7. The system of claim 6, further comprising a disassociation component configured to disable stage-2 hypervisor address translations and the hypervisor privilege level.

8. The system of claim 7, wherein the memory cache controller is further configured to enable the guest operating system privilege level to utilize a full structure of the memory cache for virtual address to physical address translation entries in response to the disassociation component disabling stage-2 hypervisor address translations.

9. The system of claim 7, wherein the disassociation component is alternately configured to disable stage-1 guest address translations and the guest operating system privilege level.

10. The system of claim 9, wherein the hypervisor privilege level is configured to utilize a full structure of the memory cache for intermediate physical address to physical address translation entries in response to the disassociation component disabling stage-1 guest address translations.

11. The system of claim 9, wherein the disassociation component is further configured to re-activate disabled stage-1 guest address translations and the guest operating system privilege level, or re-activate disabled stage-2 hypervisor address translations and the hypervisor privilege level and establish a virtual environment comprising stage-1 memory address translations combined with stage-2 memory address translations.

12. The system of claim 1, wherein at least one of the multiple distinct types of memory address translation entries supports a plurality of page sizes, and the memory cache controller is configured to store memory address translation entries associated with one or more of the plurality of page sizes in the same physical memory cache.

13. The system of claim 1, wherein the distinct types of memory address translation entries support respective pluralities of page sizes, and the memory cache controller is configured to store combinations of a distinct type of memory address translation entry and a page size in the same physical memory cache.

14. The system of claim 1, wherein the memory cache controller is further configured to cache memory address translation entries as a function of an associated one of the distinct types of memory address translation entries and as a function of an associated one of a plurality of page sizes.

15. The system of claim 1, wherein the memory cache controller is configured to execute an associative cache management policy.

16. A method of operating a translation look-aside buffer in a computer system, the method comprising:
receiving, by a memory cache controller, a first translation request comprising a first memory address;
in response to the receiving the first translation request, accessing, by the memory cache controller as a function of enabling virtualized address caching, a memory cache configured to store multiple virtualization types of memory address translation entries, wherein the multiple virtualization types comprise at least one stage-1 translation entry comprising a virtual address to physical address hypervisor memory address translation entry, at least one stage-2 translation entry comprising an intermediate physical address to physical address guest memory address translation entry, and at least one combined stage-1 and stage-2 translation entry comprising a virtual address to physical address guest memory address translation entry;
identifying, by the memory cache controller based on the accessing, whether a first memory address translation entry of a first virtualization type, of the multiple virtualization types, exists for the first memory address within the memory cache;
in response to identifying existence of the first memory address translation entry of the first virtualization type within the memory cache, providing, by the memory cache controller, the first memory address translation entry of the first virtualization type in accordance with the first translation request;
receiving, by the memory cache controller, a second memory address for a second translation request;
in response to the receiving the second memory address, accessing, by the memory cache controller as a function of disabling virtualized address caching, the memory cache;
identifying, by the memory cache controller based on the accessing, whether a second memory address translation entry of a second virtualization type, of the multiple virtualization types, exists for the second memory address within the memory cache; and
in response to identifying existence of the second memory address translation entry of the second virtualization type within the memory cache, outputting, by the memory cache controller, the second memory address translation entry of the second virtualization type in accordance with the second translation request, wherein the identifying the second memory address translation entry comprises determining the second memory address translation entry as a function of a failure of a first multipage lookup of the memory cache to identify a first mapping representing a virtual address to a physical address mapping for the second translation request, a failure of a second multipage lookup of the memory cache to identify a second mapping representing the virtual address to an intermediate physical address mapping for the second translation request, and a success of a third multipage lookup of the memory cache to identify a third mapping representative of the intermediate physical address to the physical address mapping for the second translation request; and wherein the memory cache controller is further configured to apply a base hashing function and a secondary hashing function to a memory address translation entry, the base hashing function applied to determine a set address of the memory address translation entry based on an associated page size and the secondary hashing function applied to map the memory address translation entry to the memory cache based on an associated distinct type of the memory address translation entry.

17. The method of claim 16, wherein the accessing the memory cache comprising accessing a single memory chip having a single physical location.

18. The method of claim 16, further comprising:
referencing, by the memory cache controller, a set of configuration registers based on the first memory address;
identifying, by the memory cache controller, a page size and a page look-up order for the memory address translation entry of the first virtualization type;
identifying, by the memory cache controller, a base set index of the memory cache for the memory address based on a hash function; and
identifying, by the memory cache controller, whether the memory address translation entry of the first virtualization type exists within the memory cache based on the base set index.

19. The method of claim 18, wherein the hash function is a first hash function, and the method further comprises:
identifying, by the memory cache controller, a second hash function associated with the first virtualization type;
identifying, by the memory cache controller based on the second hash function in conjunction with the first hash function, the base set index and a final set index of the memory cache for the first memory address; and
identifying, by the memory cache controller, whether the memory address translation entry of the first virtualization type exists within the memory cache from the final set index.

20. The method of claim 16, further comprising:
deriving, by the memory cache controller, a first set index for the memory address based on a first hash function, the first hash function being unique to the first virtualization type; and
deriving, by the memory cache controller, a second set index for second memory address based on a second hash function, the second hash function being unique to the second virtualization type,
wherein the first set index and the second set index relate to separate indices of a single physical cache structure of the memory cache.

21. A translation look-aside buffer (TLB) of a computer system, the translation look-aside buffer (TLB) comprising:
a memory cache controller;
a first interface configured to facilitate communication between a memory cache and the memory cache controller, the memory cache controller configured to store, in response to enabling or disabling virtualized address caching, multiple distinct types of memory address translation entries within a common physical cache structure of the memory cache, the multiple distinct types comprising at least one stage-1 translation entry comprising a virtual address to physical address hypervisor memory address translation entry, at least one stage-2 translation entry comprising an intermediate physical address to physical address guest memory address translation entry, and at least one combined stage-1 and stage-2 translation entry comprising a virtual address to physical address guest memory address translation entry; and
a second interface communicably configured to facilitate communication between the memory cache controller and a system application functioning as a guest operating system with respect to the memory cache controller,
wherein the memory cache controller is configured to, in response to receiving a request for a memory address from the system application, determine the memory address as a function of a failure of a first multipage lookup of the memory cache to identify a first mapping representing a virtual address to a physical address mapping for the memory address, a failure of a second multipage lookup of the memory cache to identify a second mapping representing the virtual address to an intermediate physical address mapping for the memory address, and a success of a third multipage lookup of the memory cache to identify a third mapping representative of the intermediate physical address to the physical address mapping for the memory address; and
wherein the memory cache controller is further configured to apply a base hashing function and a secondary hashing function to a memory address translation entry, the base hashing function applied to determine a set address of the memory address translation entry based on an associated page size and the secondary hashing function applied to map the memory address translation entry to the memory cache based on an associated distinct type of the memory address translation entry.

22. A shared translation look-aside buffer (TLB) in a computer system, the shared translation look-aside buffer (TLB) comprising:
a memory cache controller configured to store, based on enabling or disabling virtualized address caching, multiple distinct types of memory address translation entries within a common physical memory cache, the multiple distinct types comprising at least a non-virtualized virtual address to physical address memory address translation entry, a virtual address to intermediate physical address guest memory address translation entry, and a virtual address to physical address guest memory address translation entry; and
an interface configured to receive a first memory address and generate a response comprising a second memory address retrieved from the memory cache by the memory cache controller,
wherein the memory cache controller is configured to determine the second memory address as a function of a failure of a first multipage lookup of the memory cache to identify a first mapping representing a virtual address to a physical address mapping for the first memory address, a failure of a second multipage lookup of the memory cache to identify a second mapping representing the virtual address to an intermediate physical address mapping for the first memory address, and a success of a third multipage lookup of the memory cache to identify a third mapping representative of the intermediate physical address to the physical address mapping for the first memory address; and wherein the memory cache controller is further configured to apply a base hashing function and a secondary hashing function to a memory address translation entry, the base hashing function applied to determine a set address of the memory address translation entry based on an associated page size and the secondary hashing function applied to map the memory address translation entry to the memory cache based on an associated distinct type of the memory address translation entry.

23. The shared translation look-aside buffer (TLB) of claim 22, wherein the multiple distinct types further comprise at least one of a non-virtualized virtual address to physical address memory address translation entry, a virtual address to physical address hypervisor memory address translation entry, a virtual address to intermediate physical address guest memory address translation entry, a non-virtualized virtual address to physical address memory address translation entry or a virtual address to intermediate physical address guest memory address translation entry, or a non-virtualized virtual address to physical address guest memory address translation entry.

* * * * *